(No Model.) 6 Sheets—Sheet 1.

C. E. SAWYER.
MACHINE FOR CUTTING TAGS, CARDS, &c.

No. 509,854. Patented Nov. 28, 1893.

WITNESSES.
R. Henry Marsh.
Harry H. Aiken.

INVENTOR.
Charles E. Sawyer,
by P. E. Teschemacher
Atty.

(No Model.) 6 Sheets—Sheet 4.

C. E. SAWYER.
MACHINE FOR CUTTING TAGS, CARDS, &c.

No. 509,854. Patented Nov. 28, 1893.

Witnesses.

Inventor.
Charles E. Sawyer,
by Teschemacher
Atty.

(No Model.) 6 Sheets—Sheet 5.
C. E. SAWYER.
MACHINE FOR CUTTING TAGS, CARDS, &c.
No. 509,854. Patented Nov. 28, 1893.
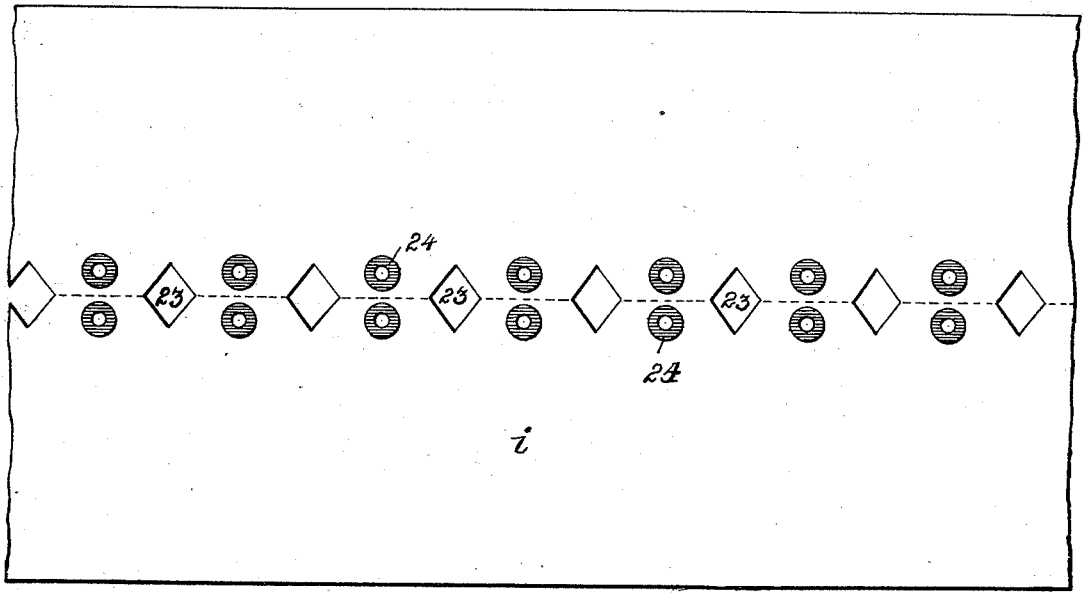
Fig. 6.
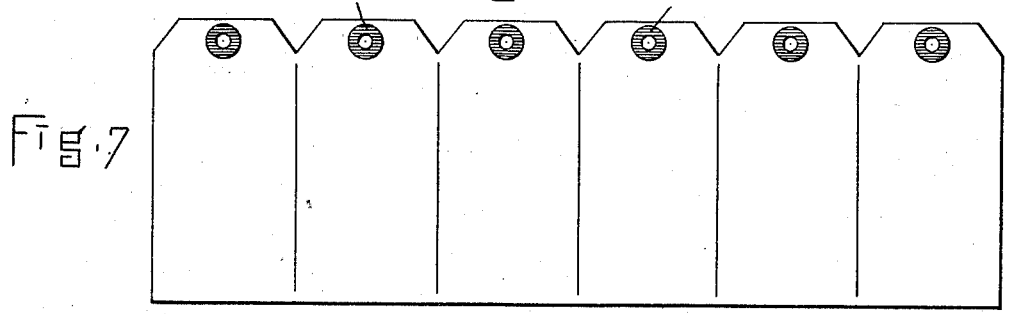
Fig. 7.
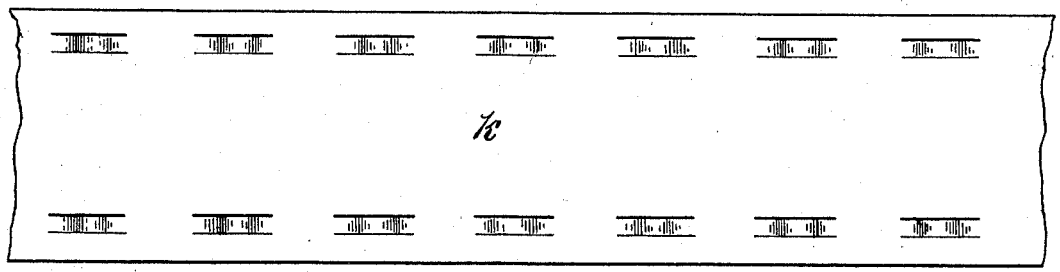
Fig. 8.
WITNESSES. Fig. 9. Fig. 10. INVENTOR.
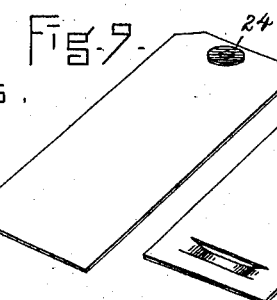
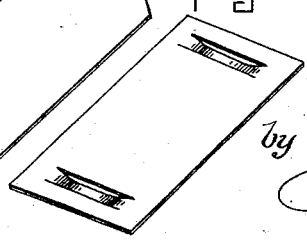
Charles E. Sawyer,
by his Atty.
THE NATIONAL LITHOGRAPHING COMPANY,
WASHINGTON, D. C.

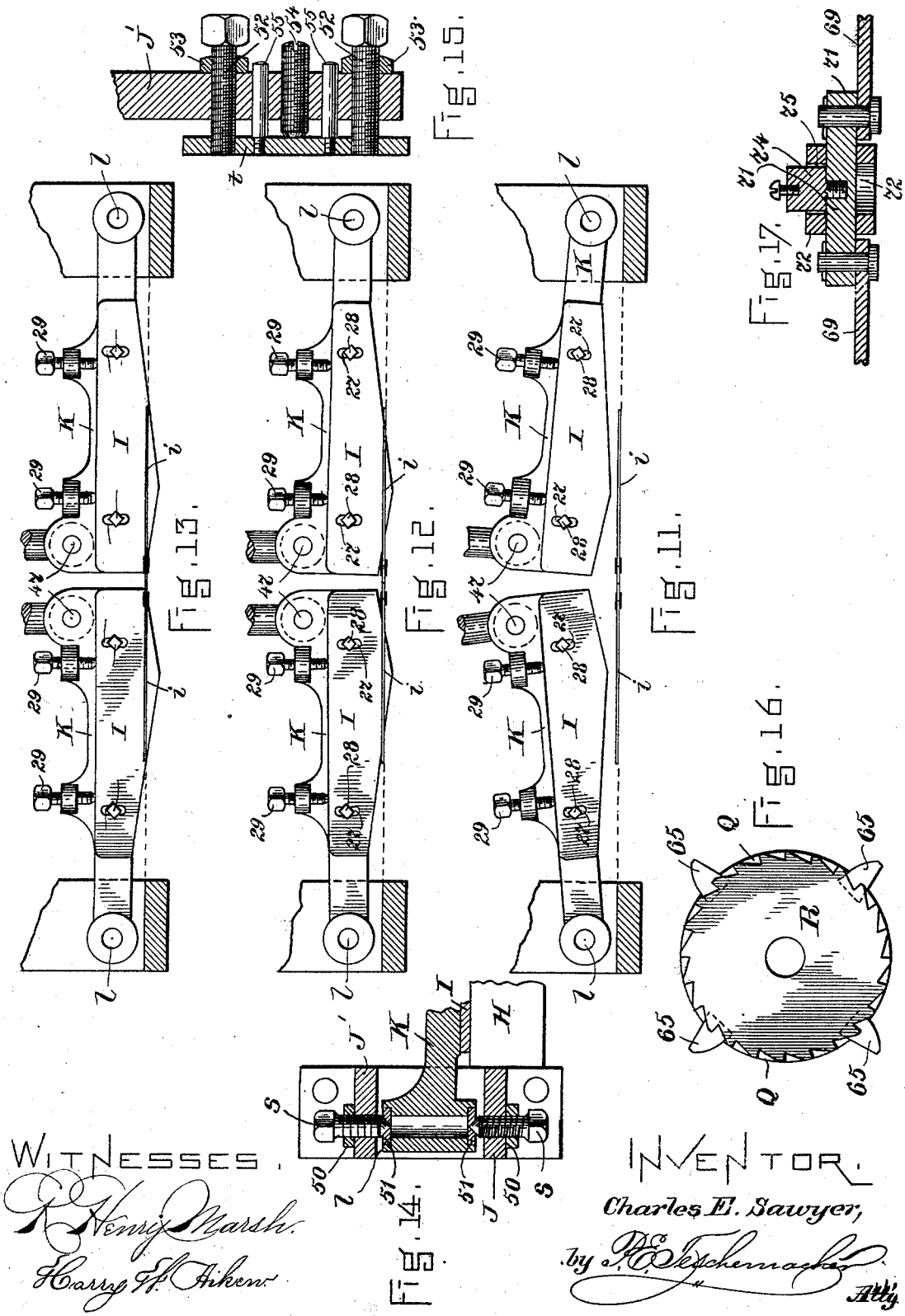

UNITED STATES PATENT OFFICE.

CHARLES E. SAWYER, OF BOSTON, MASSACHUSETTS.

MACHINE FOR CUTTING TAGS, CARDS, &c.

SPECIFICATION forming part of Letters Patent No. 509,854, dated November 28, 1893.

Application filed July 5, 1893. Serial No. 479,633. (No model.)

*To all whom it may concern:*

Be it known that I, CHARLES E. SAWYER, a citizen of the United States, residing at Boston, in the county of Suffolk and State of Massachusetts, have invented certain Improvements in Machines for Cutting Tags, Cards, &c., from Strips or Pieces of Cardboard, Paper, and other Material, of which the following is a full, clear, and exact description, reference being had to the accompanying drawings, making part of this specification, in which—

Figure 1:
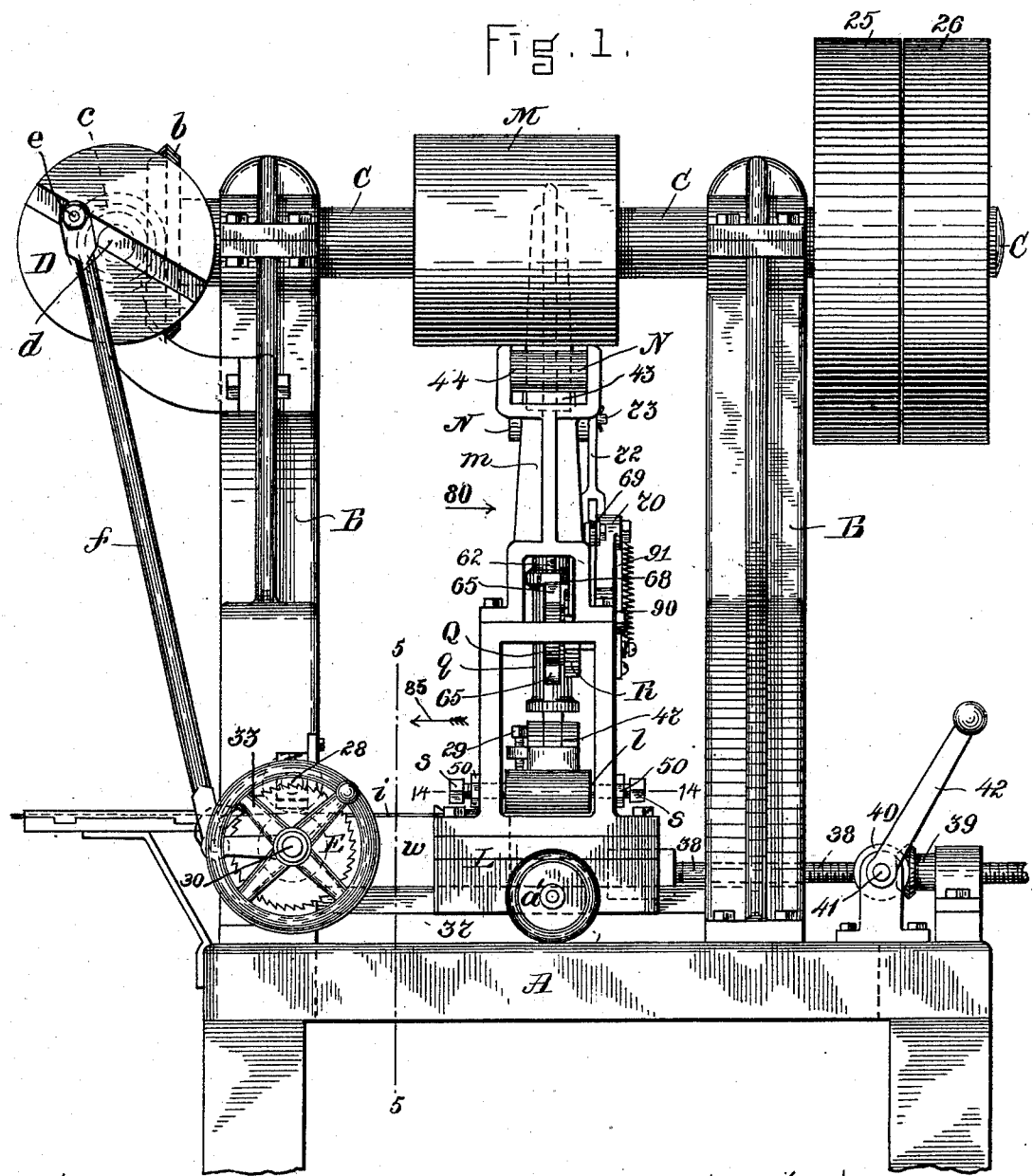
Figure 2:
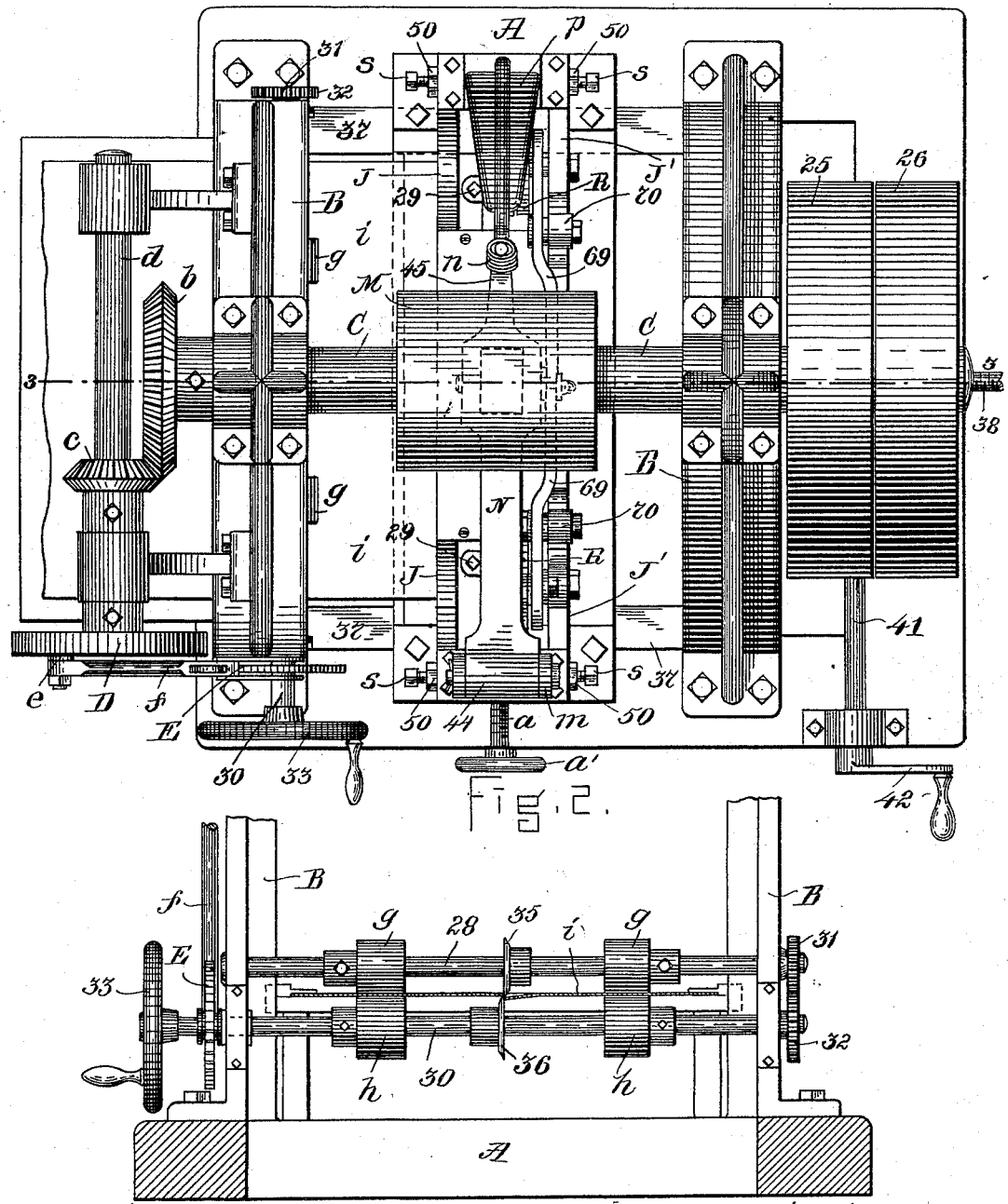
Figure 3:
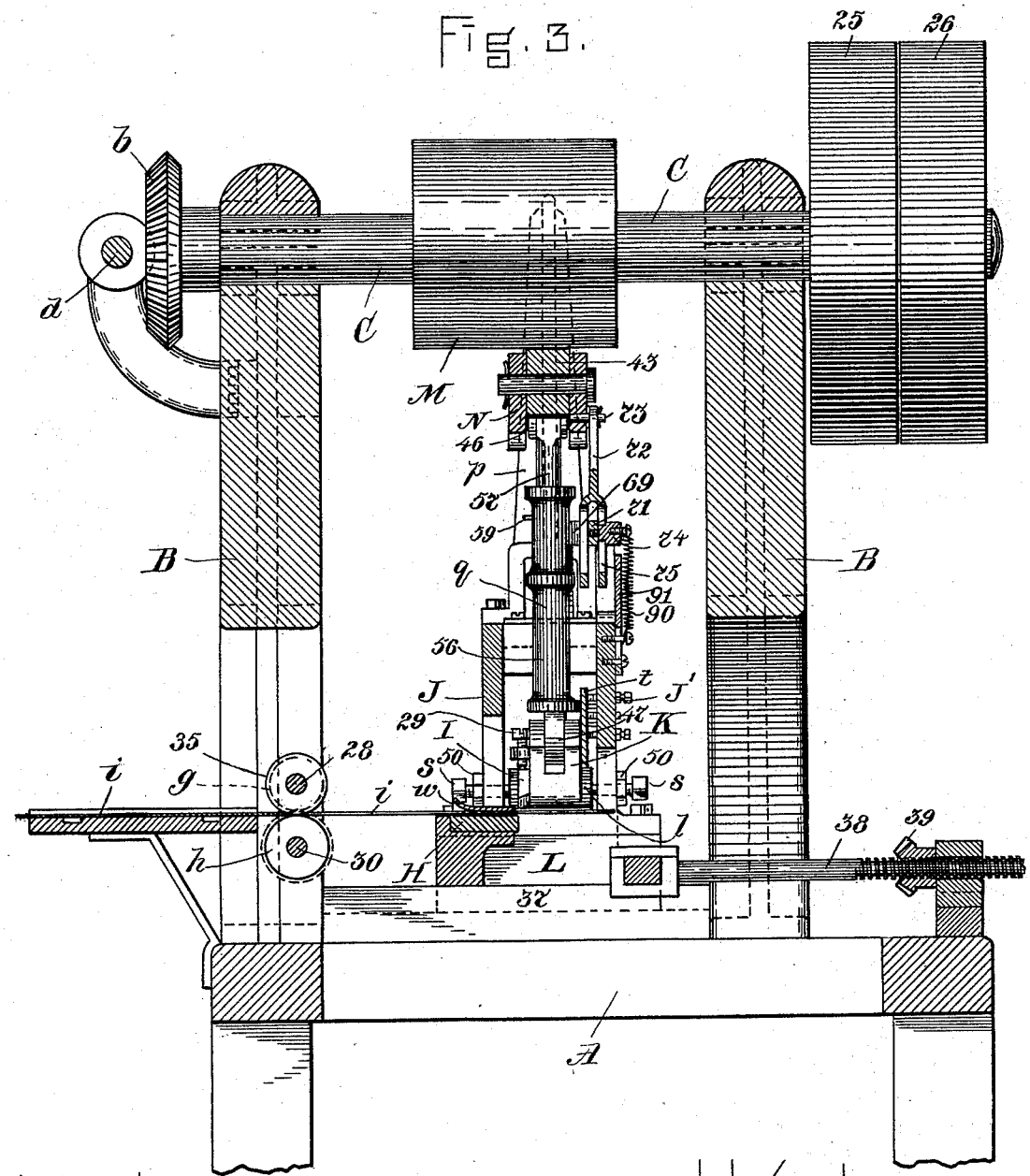
Figures 4, 18:
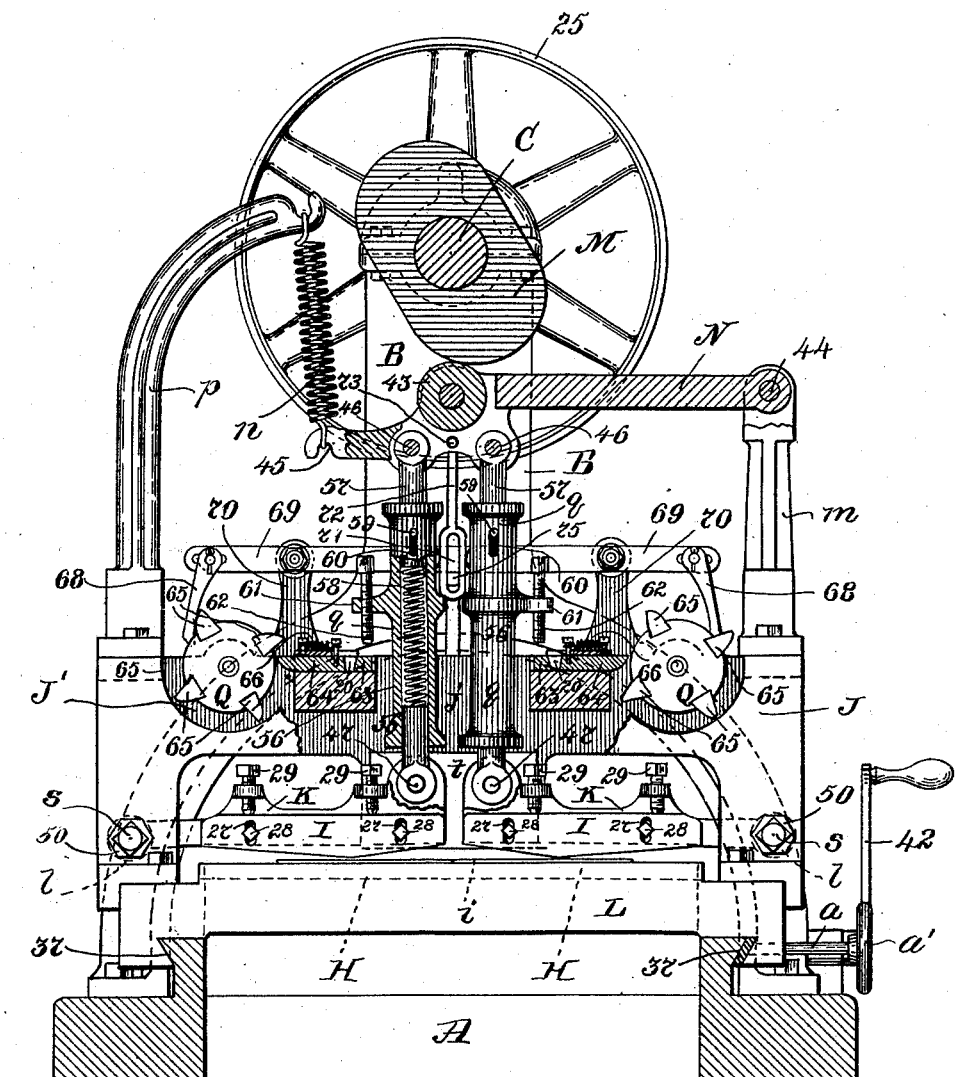

Figure 1 is a side elevation of a machine for cutting tags, cards, &c., constructed in accordance with my invention. Fig. 2 is a plan of the same. Fig. 3 is a longitudinal vertical section on the line 3, 3, of Fig. 2. Fig. 4 is a transverse sectional elevation of the machine looking in the direction of the arrow 80, Fig. 1. Fig. 5 is a transverse vertical section on the line 5, 5, of Fig. 1, looking in the direction of the arrow 85. Fig. 6 is a plan-view of a piece of the strip of cardboard which is fed into the machine, and from which the tags are to be cut. Fig. 7 is a plan-view of a series or "gang" of tags partly detached from each other to enable them to be easily torn apart when it is desired to separate them. Fig. 8 is a plan-view of a strip of jewelry cards for holding cuff-buttons or similar articles. Fig. 9 is a view of a single tag. Fig. 10 is a view of a single jewelry-card for holding a pair of cuff-buttons. Fig. 11 is a detail view of the cutters, showing them in a raised position ready to descend to make a cut. Fig. 12 is a detail view of the cutters showing them in the position which they occupy after having partially detached a tag or card from the strip. Fig. 13 is a view of the cutters showing them in their lowest position after having cut entirely through the strip. Fig. 14 is a horizontal section on the line 14, 14 of Fig. 1. Fig. 15 is a sectional detail to be referred to. Fig. 16 is a detail of the stop-operating disk or wheel and the ratchet wheel secured thereto. Figs. 17 and 18 are details to be referred to.

In the manufacture of tags, jewelry cards, and other small articles from cardboard, paper, or other suitable material, it is frequently desirable to furnish them to customers in connected series or "gangs" of any desired number in order to facilitate the subsequent operation of printing, which can be done more economically by arranging the forms to print a series of tags or cards at a single impression.

My invention relates to an improved machine whereby tags, jewelry cards, and similar small articles may be cut from a strip or piece of paper, cardboard, or other suitable material either in series or singly; and my invention consists in certain novel mechanism for automatically controlling the action of the cutters in such manner as to cause them to sever the strip at any desired point as it is intermittingly fed forward in order to cut off a piece of the required length to form either a connected series or "gang" of tags or cards, or a single one, as hereinafter more particularly set forth; and my invention also consists in certain novel combinations of parts and details of construction as hereinafter set forth and pointed out in the claims.

In the said drawings, A represents the bed, and B the framework of the machine, in suitable bearings in the upper portion of which runs the driving shaft C carrying at one end the fast and loose pulleys 25 and 26, and at the opposite end a bevel-gear $b$ which meshes with a smaller bevel-gear $c$ on a short shaft $d$ having its bearings in brackets on the framework and carrying at one end a crank-disk D having an adjustable crank-pin $e$ to which is pivoted a rod $f$, the lower end of which is connected with a ratchet and pawl mechanism E adapted to intermittingly rotate the lower one of a pair of feed-roll shafts 28, 30, carrying two pairs of feed rolls $g$, $h$, between which passes the strip of cardboard $i$ shown particularly in Figs. 3, 5, and 6, from which the tags are to be cut, said strip being in this case of double width to form a line of tags on each side of the central dotted line shown in Fig. 6.

The shaft 28 of the upper feed-rolls $g$, is forced downward toward the shaft 30 of the lower feed-rolls $h$ by means of suitable springs which exert a pressure upon the vertically sliding boxes of said upper feed-roll shaft, whereby the necessary friction upon the strip is produced to insure a positive intermittent feed, each movement of the feed rolls carrying the strip $i$ forward a distance equal to the width of a single tag or card. The feed-roll shafts 28, 30 are connected at one end so as to revolve together by means of gears 31, 32, Fig. 5, the shaft 30 being provided with a hand-wheel 33 whereby it may be turned by hand when it is desired to enter a fresh strip between the feed-rolls. The shafts 28, 30, are also provided midway between the two pairs of feed-rolls with a pair of rotary shears or cutters 35, 36 which serve to divide the strip $i$ longitudinally along the dotted line shown in Fig. 6, as it is carried forward by the feed-rolls $g$, $h$.

The strip $i$ shown in Fig. 6, before being fed to the rolls $g$, $h$, is perforated at 23 and provided with reinforcing washers 24 as required, to enable it to be cut up into tags shown in Fig. 9; and the strip $k$ shown in Fig. 8, is provided with suitable perforations or slits to enable it to be cut up into jewelry cards, shown in Fig. 10.

H, H, are two adjustable bed-cutters formed in a single piece extending transversely across the machine as shown in Figs. 3 and 4, each having a straight horizontal edge; and I, I, are two swinging cutters arranged above the cutters H and adapted to co-operate therewith, said cutters I, I, being adjustably secured by slots and screw-bolts 27, 28, and adjusting screws 29, to cutter levers K, K, pivoted at $l, l$, between two vertical pieces or plates J, J', rising from and forming a part of a carriage L to which is also adjustably secured the bed-cutters H, H, said carriage L being adapted to slide horizontally on dovetail ways 37 on the bed A, and having secured to it a rod 38, which is provided at its outer end with a screw thread and is moved in the direction of its length to vary the position of the carriage by means of a small bevel-gear 39 threaded to fit the rod 38 which passes therethrough, said gear 39 meshing with a bevel gear 40, Fig. 1, on a shaft 41 provided with a crank handle 42 by which means the carriage L may be moved forward and back on its ways to vary the distance between the feed-rolls and the cutters in order that the latter may make a cut exactly on the division line between two contiguous tags or cards, a nice adjustment being necessary to produce accurate work where a change is made in the width of the tag or a new strip is inserted between the feed-rolls. After the carriage has been adjusted it is clamped immovably in place by means of a clamping screw $a$, Fig. 4, provided with a hand wheel $a'$.

To the driving shaft C is secured a heavy cam M which acts upon an anti-friction roll 43 mounted in a lever N pivoted at 44 to the upper end of a post $m$ secured to and rising from the side-plates J J' of the carriage L, said lever being drawn upward to keep the roll 43 constantly in contact with the cam by means of a spiral spring $n$, one end of which is secured to the lever at 45 while the opposite end is hooked over the upper end of a post $p$ secured to and rising from the plates J J', opposite to the post $m$. The width of the cam M is such that the roll 43 of the lever N will remain in full contact therewith as the carriage L is adjusted on its ways toward and from the feed rolls $g$, $h$, and rotary shears 35, 36.

To the lever N are pivoted at 46, 46, two connecting rods $q$, $q$, the lower ends of which are pivoted at 47, 47, to the two cutter levers K, K, whereby as the shaft C is rotated, the cam M acting on the roll 43 of the lever N, depresses the latter against the stress of the spring $n$ and through the connections described causes the cutters I, I, to be swung downward to cut the strip as required, the upward movement of the cutters being effected by the spring $n$ which draws up the lever N as the cam revolves; a single revolution of said cam producing, in connection with the spring $n$, two downward and two upward movements of the cutters I, I. The lower edge of each cutter I is beveled longitudinally in opposite directions as shown in Figs. 4, 11, 12, and 13, to produce a shearing cut and also to cause the lowermost part or angle of its cutting edge to first enter the strip and cut gradually in opposite directions as it descends, this construction enabling the cutter to be adjusted to cut the strip either partially or wholly across its width according as it is forced down more or less, as will be readily understood by reference to Figs. 12 and 13, Fig. 12 showing the cutters after having partially cut through the strip, and Fig. 13 showing them after having cut entirely through the same. The cutter-levers K, K, are each pivoted to the side pieces J, J', of the carriage L by means of two screws $s$, $s$, provided with check-nuts 50, as shown in Figs. 1, 4, and 14, said screws $s$ having conical points which enter recesses in steel bearing-disks 51 inserted in the opposite sides of the end of the cutter-lever; and by means of these screws $s$, $s$, the levers K, K, can be adjusted laterally to compensate for the wear of the upper or lower cutters which can thus be readily kept in proper lateral adjustment with relation to each other. To prevent lateral movement or spring of the free ends of the cutter-levers K, K, away from the stationary bed cutters H, I provide a backing-plate $t$, shown in Figs. 3 and 15, which is secured to the plate J' of the carriage L by means of screws 52 provided with check-nuts 53, said plate being pressed up against the sides of the free ends of the levers K, K, which move in contact therewith as they are swung up and down by the connecting rods $q$, $q$. The plate $t$ is adjusted for wear and kept closely in contact at all times with the levers K, K, by means of the screws 52 and other screws 54, one only of the latter being shown, the plate being guided and maintained in parallelism with the plate J' by pins 55 secured to the plate $t$ and sliding through said plate J'.

Immediately above the bed-cutters H is secured a guide plate $w$, Fig. 3, the front edge of which is curved upward to facilitate the entrance of the strip $i$ which passes through the throat that is formed between the plate $w$ and the bed-cutters H, said plate serving as a clearer to prevent the upper cutters I, I, as they rise, from lifting the strip up from the bed-cutters H.

I will now describe the manner in which the movable cutters I, I, are automatically held out of action or prevented from cutting entirely through the strip until after it has been fed forward a predetermined number of times, whereby pieces of the strip $i$, each of sufficient length to form a series or "gang" of tags or cards of the required number, as shown in Fig. 7, are caused to be cut off without care or attention on the part of the operator.

Each of the connecting rods $q, q$, is constructed to yield in the direction of its length against the resistance of a spring and is composed of a tubular portion or sleeve 56 which is pivoted to the cutter-lever K at 47, and a plunger 57 pivoted at its upper end to the lever N at 46, and adapted to slide within the tubular portion 56 as shown in Fig. 4, where it rests upon a spiral spring 58 of sufficient rigidity to transmit the pressure of the plunger 57 to the tubular portion 56, and thence to the cutter-lever K and cutter I to cause the latter to cut the strip on the descent of the lever N; the vertical movement of the plunger 57 within the tubular portion 56 being limited by a pin 59 and slot 60. The tubular portion 56 is provided on one side with a lug or projection 61 through which passes vertically an adjusting-screw 62, the lower end of which is adapted to strike against the end 63 of a horizontal slide 64 which thus forms a stop for arresting the descent of the portion 56 and cutter-lever K connected therewith, thereby preventing the cutter I from passing through the strip to sever the same on the division line between two consecutive tags. As soon as the screw 62 strikes the stop 63 the plunger 57 of the rod or connection $q$ slides within the portion 56, compressing the spring 58, which thus takes up the remainder of the downward movement of the lever N as the latter is actuated by the cam M. By adjusting the screws 62 to cause them to project more or less below the lug 61, the positions of the cutters I, I, when their downward movement is interrupted, may be varied as desired to cause them to partially cut through the strip $i$ on the division line between two consecutive tags or cards, as shown in Fig. 12, or so that they will be prevented from coming into contact at all with the strip, as shown in Fig. 11 until after the withdrawal of the stop 63.

As before stated the strip is fed forward a distance equal to the width of a single tag or card at each intermittent movement of the feed rolls $g, h$, which movement is followed by the descent of the cutters I, I, and after a piece of the strip $i$ containing the desired number of tags has been fed forward, the slides 64, (one for each cutter) are each moved horizontally by a disk or wheel Q provided with projections 65, against the resistance of a light spring 66, Fig. 4, to bring an aperture 20 shown in Figs. 4 and 18 in said slide immediately beneath the end of the screw 62, thus pushing out of the way or withdrawing the stop 63 and permitting the portion 56 of the connecting rod $q$ to be forced down by the lever N to the full extent of its movement, which causes the cutter connected therewith to pass entirely through the strip as shown in Fig. 13, thus cutting off therefrom a series or "gang" of connected tags as shown in Fig. 7, after which the slide 64 is released as the disk Q revolves, when the slide is moved by the spring 66 to again bring the stop 63 beneath the screw 62 which causes the action of the cutters to be again interrupted until another portion of the strip of the desired length has been fed forward, when the operation is repeated. I do not limit myself to the exact construction of the stop-operating disk Q, as it may be provided with notches or divisions or otherwise constructed to periodically withdraw or move a stop out of the way of the screw 62 to allow the cutters to sever the strip as above described. Each disk Q has secured to it a ratchet wheel R, as shown in Fig. 16, both being supported by and free to revolve on a horizontal stud or pin secured to the plate J' of the carriage L; said ratchet wheels being each actuated by a pawl 68 pivoted to the end of a lever 69 fulcrumed on a post 70 rising from the plate J'. These levers 69 are both pivoted to a link 71 shown in Figs. 3, 4, and 17, which fits within the enlarged bifurcated end of a rod 72, Figs. 4 and 17, the upper end of which is pivoted to the lever N at 73, said link 71 being held in place by a square block 74 projecting therefrom into a slot 75 in the lower bifurcated end of the rod 72, whereby as the lever N is moved up and down by the cam M and spring $n$, sufficient motion will be communicated to the levers 69 to cause the pawls 68 to move the ratchet wheels R one notch at each upward movement of the lever N, the difference between the amount of motion of the lever N and that required for the levers 69 being compensated for by the slot 75 in the rod 72 which takes up the lost motion. On the descent of the lever N, the link 71 and with it the levers 69 are drawn down by a spring 90 shown in Figs. 1 and 3, an adjustable stop 91 serving to limit the downward movement of the said levers 69. Each of the disks Q is provided with four projections 65, while the ratchet wheel R secured thereto has twenty-four teeth. Consequently each of the stops 63 is withdrawn or moved out of the way of the screw 62 thereover as soon as the feed rolls $g, h$, have fed forward a length of the strip $i$ containing six tags or cards, as seen in Fig. 7, and it will be obvious that by varying the relative proportion between the number of projections or divisions of the disk Q and the number of teeth of the ratchet-wheel, making one the multiple of the other, a "gang" or series of any desired number of tags or cards can be cut from the strip, and if it should be desired to cut the tags or cards one by one, or singly from the strip, it is merely necessary to adjust the screw 62 so that it will not come into contact with the stop 63, when the cutters will descend to sever the strip after each forward movement of the feed rolls.

Although the machine here shown and described is designed for simultaneously cutting from a single strip two rows or lines of tags arranged side by side as shown in Fig. 6, it is obvious that it may be used to cut a single row of tags or cards from a strip of suitable width, in which case the cutters on one side of the machine only would be employed, but if desired a machine may be constructed with a single pair of cutters only adapted for cutting a single row of tags or cards only without departing from the spirit or my invention.

From the foregoing it will be seen that my improved machine can be employed, first for cutting partly through the strip on the division lines between consecutive tags or cards as shown in Fig. 7, to enable them to be easily torn apart when it is desired to separate them; secondly for cutting the strips into series or "gangs" of tags or cards; thirdly, for cutting pairs of cards on the same division line transversely across the strip; and fourthly, for cutting single cards, advantages of great importance in machines of this character, as it enables them to be used for a great variety of purposes.

What I claim as my invention, and desire to secure by Letters Patent, is—

1. A machine for cutting tags, cards, &c., comprising an intermittent feeding device for the strip or piece of material to be cut, a cutter for slitting or dividing the material along the center of its length, two pairs of cutters arranged transversely in line, one cutter of each pair being provided with an operating rod or connection adapted to yield in the direction of its length, means for simultaneously operating said rods or connections, stops for interrupting the movement of the cutter-operating mechanism, stop-operating disks or wheels for withdrawing said stops at predetermined intervals, and ratchet-and-pawl-mechanism connected with the stop-operating disks or wheels, and with the mechanism for actuating the cutters, whereby the stops are withdrawn after the strip has been fed forward a predetermined number of times by the intermittent feeding device, substantially as described.

2. In a machine for cutting tags, cards, &c., the sliding carriage L provided with stationary and movable cutters H, I, in combination with the lever N, its actuating cam M and spring $n$, the connection $q$ between the lever N and the movable cutter-lever, said connection being adapted to yield in the direction of its length and consisting of a tubular portion 56 and plunger 57 and a spring 58, the adjusting screw 62, a sliding stop co-operating with said screw, the stop-operating disk or wheel Q provided with the ratchet wheel R, the pawl 68, lever 69, and suitable connections between the latter and the lever N, all operating substantially as set forth.

3. In a machine for cutting tags, cards, &c., the combination, with the feed-rolls for intermittingly feeding the strip to be cut, of a pair of cutters, one of said cutters being provided with an operating rod or connection adapted to yield in the direction of its length; mechanism for operating the movable cutter, a stop adapted to interrupt the movement of the cutter operating mechanism, a disk or wheel provided with projections or divisions for periodically actuating the stop and having a ratchet wheel secured thereto, the number of the teeth of which are a multiple of the number of projections or divisions of the stop-operating disk or wheel, and a pawl for actuating the ratchet wheel, said pawl being pivoted to a lever connected with the cutter operating mechanism, whereby the stop is withdrawn to permit the cutters to sever the strip after it has been fed forward a predetermined number of times, all constructed to operate substantially as described.

Witness my hand this 29th day of June, A. D. 1893.

CHARLES E. SAWYER.

In presence of—
P. E. TESCHEMACHER,
HENRY H. LEE.